(12) United States Patent
Woryk

(10) Patent No.: US 11,092,439 B2
(45) Date of Patent: Aug. 17, 2021

(54) LEVEL MULTITOOL

(71) Applicant: Joseph Edward Woryk, New Castle, PA (US)

(72) Inventor: Joseph Edward Woryk, New Castle, PA (US)

( * ) Notice: Subject to any disclaimer, the term of this patent is extended or adjusted under 35 U.S.C. 154(b) by 85 days.

(21) Appl. No.: 16/687,547

(22) Filed: Nov. 18, 2019

(65) Prior Publication Data

US 2020/0232795 A1    Jul. 23, 2020

Related U.S. Application Data

(60) Provisional application No. 62/768,728, filed on Nov. 16, 2018.

(51) Int. Cl.
*G01C 9/26* (2006.01)
*G01C 15/00* (2006.01)
*G01B 3/06* (2006.01)
*G01C 9/34* (2006.01)

(52) U.S. Cl.
CPC ............ *G01C 15/008* (2013.01); *G01B 3/06* (2013.01); *G01C 9/26* (2013.01); *G01C 9/34* (2013.01)

(58) Field of Classification Search
CPC .......... G01C 15/008; G01C 9/26; G01C 9/34; G01B 3/06
USPC .................................................... 33/379, 381
See application file for complete search history.

(56) References Cited

U.S. PATENT DOCUMENTS

| | | | | |
|---|---|---|---|---|
| 740,742 A * | 10/1903 | Bush | ......... | G01C 9/26 33/342 |
| 1,887,878 A * | 11/1932 | Smith | ......... | G05G 5/06 74/527 |
| 1,894,489 A * | 1/1933 | Hirosejun | ......... | E06C 1/39 182/23 |
| 3,693,469 A * | 9/1972 | Ozaki | ......... | B62K 23/06 74/489 |
| 3,693,770 A * | 9/1972 | Charchian | ......... | B65G 43/04 192/30 W |
| 3,943,794 A * | 3/1976 | Shimada | ......... | B62M 25/04 74/501.5 R |
| 4,666,328 A * | 5/1987 | Ryu | ......... | E06C 1/32 403/92 |
| 5,174,034 A * | 12/1992 | Swanda | ......... | G01C 9/10 33/365 |
| 5,279,387 A * | 1/1994 | Swiderski | ......... | E06C 1/32 182/108 |
| 5,689,999 A * | 11/1997 | Wiley | ......... | A61G 5/12 74/527 |

(Continued)

*Primary Examiner* — George B Bennett
(74) *Attorney, Agent, or Firm* — Paul D Bangor, Jr., Esquire; Clark Hill PLC

(57) ABSTRACT

A level multitool, comprising a plurality level bodies, wherein each of the plurality of level bodies comprises at least one level, bubble level or spirit level and wherein each of the plurality of level bodies is removably connected to another of the plurality of level bodies by a hinge such that a first level body connected by a first hinge can articulate with respect to a second level body connected thereto via the first hinge so that the first and second level bodies may be releasably locked by the first hinge in a plurality of positions wherein an angle between the first and second level bodies at each position is different than the angle therebetween at each of the other plurality of positions.

11 Claims, 5 Drawing Sheets

(56) References Cited

U.S. PATENT DOCUMENTS

| | | | | |
|---|---|---|---|---|
| 6,029,359 A * | 2/2000 | Szumer | ............... | G01C 9/28 33/373 |
| 6,244,779 B1 * | 6/2001 | Slasinski | ............ | F16C 11/10 403/110 |
| 8,117,760 B1 * | 2/2012 | Revell | ............... | G01B 3/08 33/458 |
| 2010/0000107 A1 * | 1/2010 | Cobb | ............... | G01C 9/26 33/374 |
| 2018/0306579 A1 * | 10/2018 | Bryce | ............... | G01C 9/34 |

* cited by examiner

LEVEL MULTITOOL

CROSS REFERENCE TO RELATED APPLICATIONS

The present application claims the benefit of provisional patent application U.S. patent application Ser. No. 62/768,728 entitled "LEVEL MULTITOOL" and filed Nov. 16, 2018, the entirety of which is incorporated herein by reference for all purposes.

TECHNICAL FIELD OF THE INVENTION

The present disclosure generally relates to the field of carpenter levels and, more particularly, to carpenter levels comprising one or more level bodies coupled by hinges that permit angular adjustment of the coupled level bodies with the ability to temporarily lock-in commonly used angles between level bodies.

BACKGROUND OF THE DISCLOSURE

Traditional carpenter levels lack the ability to level around corners such as around a wall, between or around adjoining walls or from one portion of a roof to another. Further limitations and disadvantages of conventional and traditional carpenter levels will become apparent to one of skill in the art through comparison of such devices with the present disclosure as set forth in the remainder of the present application with reference to the drawings.

BRIEF SUMMARY OF THE DISCLOSURE

Many other variations are possible with the present disclosure, and those and other teachings, variations, and advantages of the present disclosure will become apparent from the description and figures of the disclosure.

One aspect of a preferred embodiment of the present disclosure comprises a level multitool, comprising a plurality level bodies, wherein each of the plurality of level bodies comprises at least one level, bubble level or spirit level and wherein each of the plurality of level bodies is removably connected to another of the plurality of level bodies by a hinge such that a first level body connected by a first hinge can articulate with respect to a second level body connected thereto via the first hinge so that the first and second level bodies may be releasably locked by the first hinge in a plurality of positions wherein an angle between the first and second level bodies at each position is different than the angle therebetween at each of the other plurality of positions.

In another aspect of a preferred level multitool of the present disclosure, each hinge comprises two slotted hinge inserts defining slots and openings fastened together by hinge bars, also defining openings, disposed in the slots and bolts inserted in the respective openings in the hinge inserts and hinge bars.

In yet another aspect of a preferred level multitool of the present disclosure, each hinge insert comprises a quick disconnect tab, preferably spring-loaded, that is received in an opening in the level body in which it is installed.

In another aspect of a preferred level multitool of the present disclosure, one or more sides of one or more of the plurality of level bodies defines a rule or ruler or has a rule or ruler disposed thereon.

In yet an additional aspect of a preferred level multitool of the present disclosure, each of the plurality of level bodies may be aligned co-linearly to increase a straight line length of level multitool.

In another aspect of a preferred level multitool of the present disclosure, each hinge comprises a lock-in positioner mechanism to releasably lock the level bodies connected via each respective hinge in one or more discreet angles between two respective level bodies connected via each hinge.

In yet another aspect of a preferred level multitool of the present disclosure, each hinge and/or lock-in positioner mechanism comprises means for releasably locking the level bodies connected via each respective hinge in one or more discreet angles between two respective level bodies connected via each hinge.

In another aspect of a preferred level multitool of the present disclosure, each of the level bodies and hinges comprises a light-weight material such as aluminum, lexan, other plastic or wood.

In yet another aspect of a preferred level multitool of the present disclosure, one or more sides of one or more of the plurality of level bodies has a magnet affixed thereon or built therein.

In another aspect of a preferred level multitool of the present disclosure, one or more sides of one or more of the plurality of level bodies has an angled vial, level, bubble level or spirit level affixed thereon or built therein.

In yet another aspect of a preferred level multitool of the present disclosure, one or more sides of one or more of the plurality of level bodies has a threaded mount or rail system for mounting an optional tool such as a laser level to one or more of the level bodies.

BRIEF DESCRIPTION OF THE SEVERAL VIEWS OF THE DRAWINGS

For the present disclosure to be easily understood and readily practiced, the present disclosure will now be described for purposes of illustration and not limitation in connection with the following figures, wherein.

DETAILED DESCRIPTION

Figure 1:
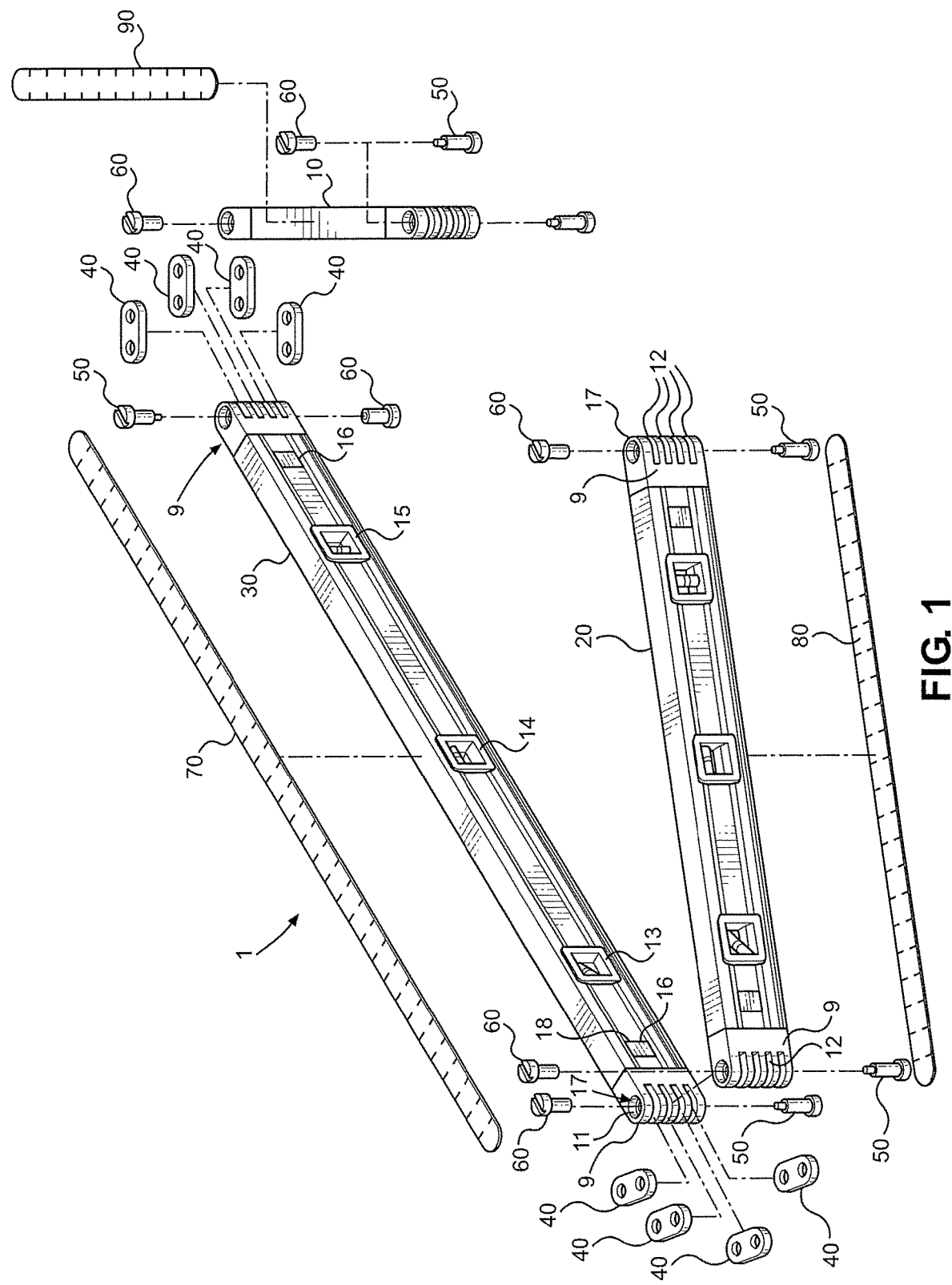
FIG. 1 is an exploded view showing various components of a preferred embodiment of a level multitool of the present disclosure.

In the following detailed description, reference is made to the accompanying examples and figures that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single disclosure or inventive concept if more than one is in fact disclosed.

The following description is, therefore, not to be taken in a limited sense, and the scope of this disclosure is defined by the appended claims.

FIGS. 1-7 illustrate a new modular multi-body level 1 comprising level bodies 10, 20 and 30 connected together via hinges 9 for rotational movement with respect to each other. One or more of the level bodies 10, 20 and 30 preferably comprises level vials 13, 14 and 15 for reading pitch, horizontal level and vertical level, respectively. Preferably, level vials 13, 14 and 15 are made from durable, easy to read acrylic or other similar material.

Each hinge 9 comprises two slotted hinge inserts 11 defining slots 12 and openings 17 fastened together by hinge bars 40 disposed in slots 12 and bolts 50 and 60 inserted therein and fastened to each other.

Each hinge insert 11 also preferably comprises a quick disconnect tab 16, preferably spring-loaded, that is received in opening 18 in each level body 10, 20 and 30. The quick disconnect tabs 16 allows the multi-body level 1 to be quickly assembled, disassembled or have level bodies added thereto. Such quick assembly/disassembly of multi-body level 1 allows multiple people to use different level bodies 10, 20 and 30 at the same time on a job site.

Preferably, disposed on one or more sides of each level body 10, 20 and 30 is an appropriately sized rule 90, 80 and 70, respectively. In a preferred embodiment of the multi-body level 10 of the present disclosure, level body 10 and rule 90 are about 12 inches long, level body 20 and rule 80 are about 24 inches long and level body 30 and rule 70 are about 36 inches long.

Figure 2:
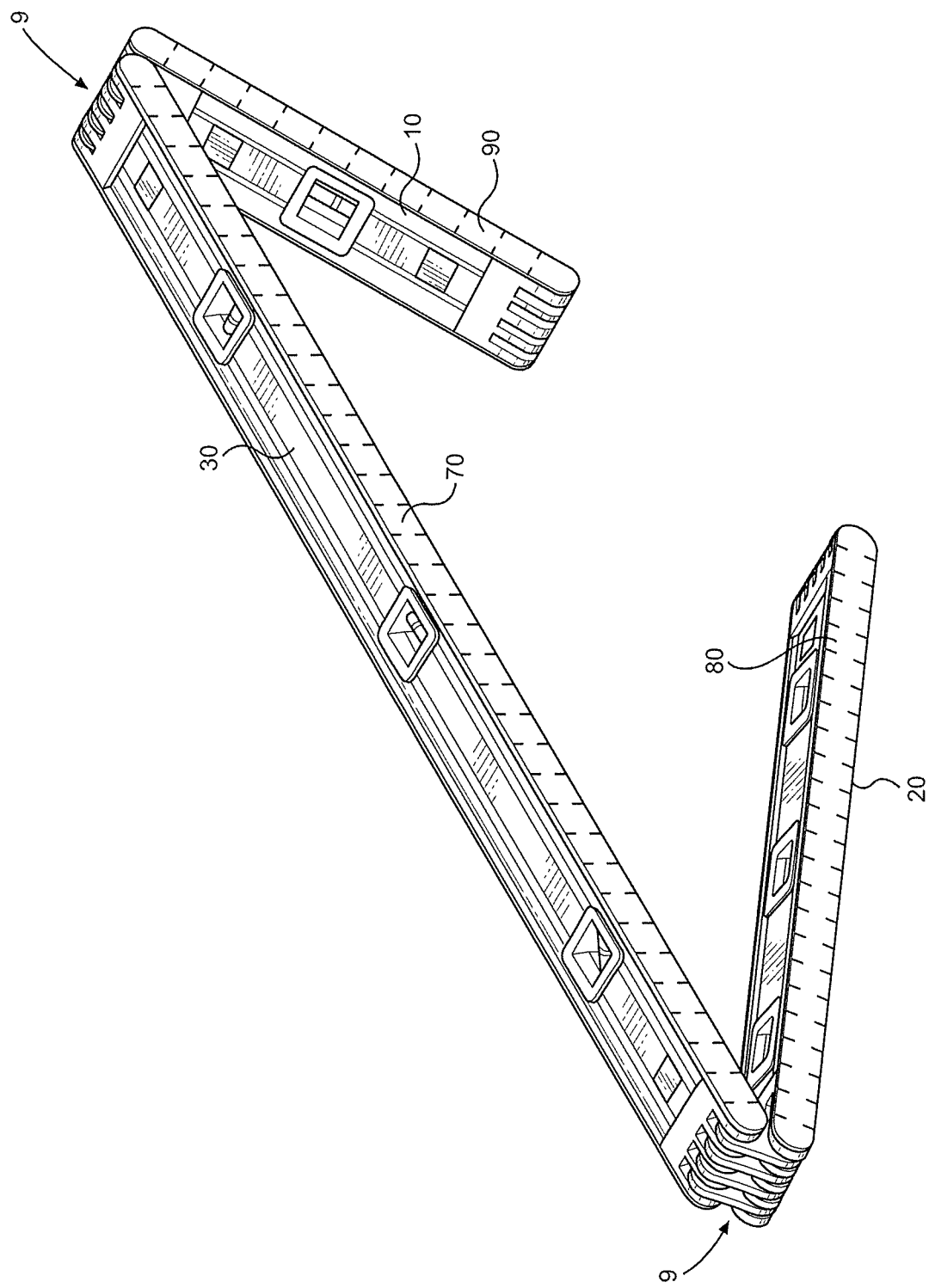
FIG. 2 is a perspective view of a preferred embodiment of a level multitool of the present disclosure.
Figure 3:
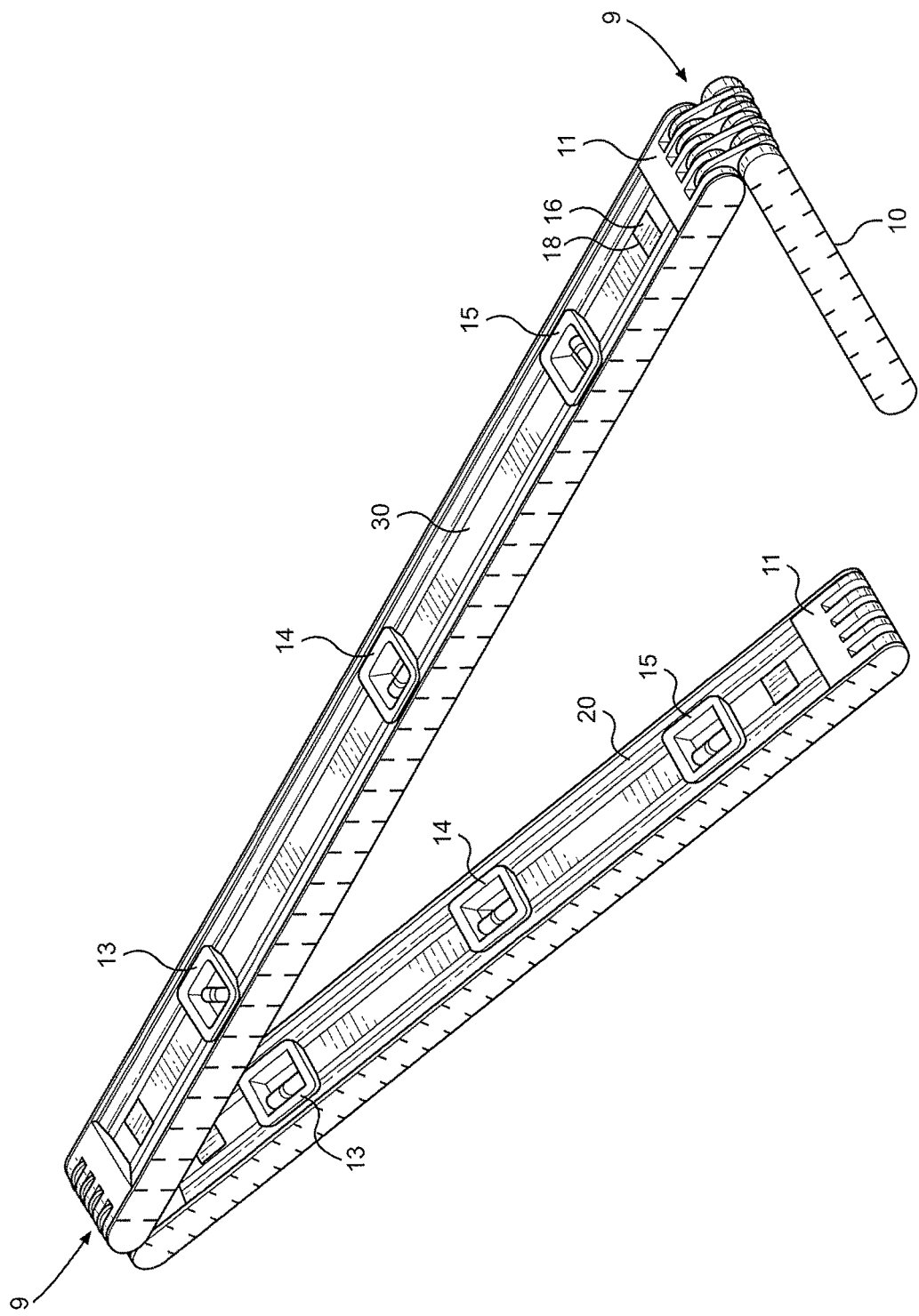
FIG. 3 is another perspective view of the level multitool of FIG. 2.
Figure 4:
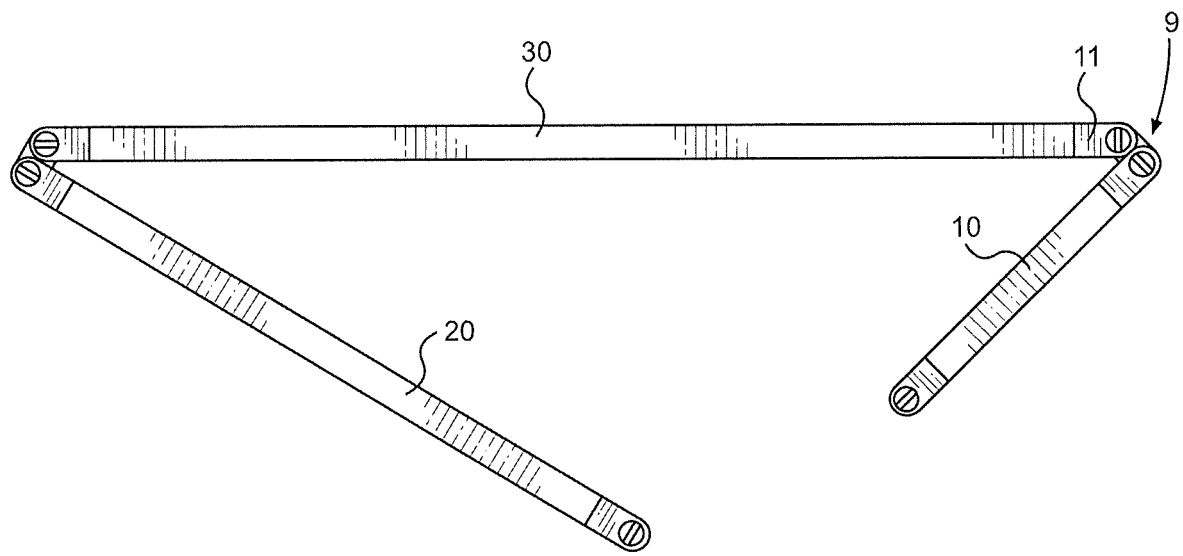
FIG. 4 is a side view of the level multitool of FIG. 2.
Figure 5:
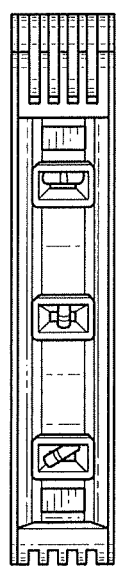
FIG. 5 is an end view of the level multitool of FIG. 2.
Figure 6:
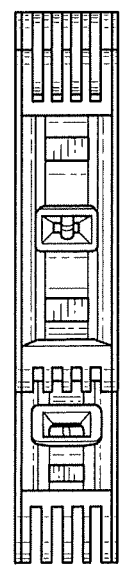
FIG. 6 is another end view of the level multitool of FIG. 2.
Figure 7:
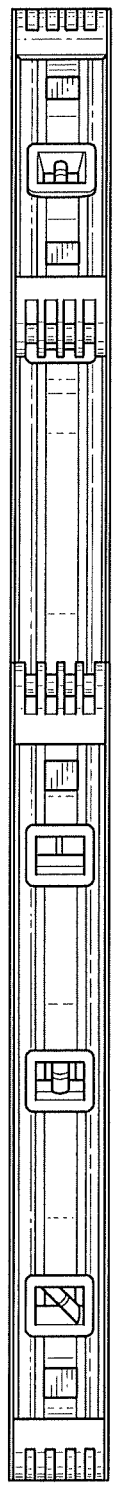
FIG. 7 is an elevational view of the level multitool of FIG. 2 in a fully stowed position.

As shown in FIGS. 2, 3 and 4, level bodies 10 and 20 may be rotated to various positions with respect to level body 30. As shown in FIG. 7, all three level bodies 10, 20 and 30 may be aligned co-linearly to increase the straight line length of multi-body level 1. Additionally, level bodies 10 and 20 may be folded flush onto level body 30 for stowing and storage.

Figure 9:
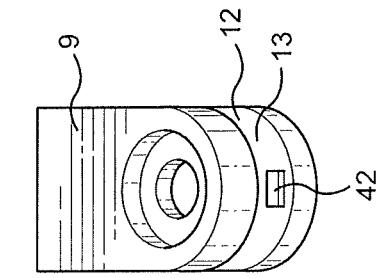
FIG. 9 is a partial schematic view of a preferred hinge of the present disclosure.
Figure 8:
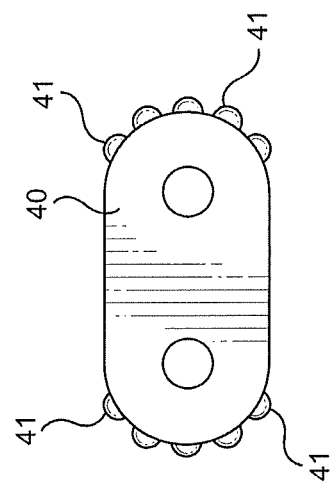
FIG. 8 is a schematic view of a preferred hinge bar of the present disclosure.

Each hinge 9 preferably comprises a lock-in positioner mechanism to quickly and easily lock-in commonly used angles, such as 15°, 22½°, 45° and 90°, as well as any other desired angle between two of the level bodies 10, 20 and 30. FIGS. 8 and 9 illustrate a preferred embodiment of a lock-in positioner mechanism of the present disclosure comprising a plurality of preferably rounded gear teeth 41 on one or more curved ends of one or more hinge bars 40 wherein each gear tooth is capable of being removably received in an indentation 42 defined by the inside wall 13 within one or more of the slots 12 of one or more of the hinges 9. In operation, rotational force exerted on a level body 10, 20 and/or 30 will cause the gear teeth 41 to move into its respective indentation 42 to temporarily lock the level body 10, 20 and/or 30 at a given angle to another level body. Additional rotational force provided on the level body 10, 20 and/or 30 can move another of the gear teeth 41 into the indentation 42 to change the angle between level bodies 10, 20 and/or 30.

Many additional types of angularly adjustable hinges or couplings have been developed for a wide variety of applications. Examples of different types of constructions and applications for such angularly adjustable, releasably locking hinges are described in U.S. Pat. Nos. 1,887,878; 1,894,489; 3,693,469; 3,693,770; 3,943,794; 4,666,328; 5,279,387; 5,689,999 and 6,244,779 each of which are incorporated by reference herein for all purposes. Additional hinge bodies (not shown) may be added to any open hinge insert(s) 11 in any configuration of the multi-body level 1.

Preferably, multi-body level 1 is manufactured out of a light-weight material such as aluminum, lexan, other plastic, wood, etc. or any other suitable material.

In addition to rules 70, 80 and 90, multi-body level 1 may have additional rules either attached to or integrally formed with level bodies 10, 20 and 30 so that to enable use to easily measure out work from virtually every side of level bodies 10, 20 and 30.

Preferably, Multi-body level 1 additionally may comprise built-in magnets on each level body 10, 20 and 30 for doing steel studding and the like.

Angled level vial 13 of Multi-body level 1 preferably may be used to set the pitch of rafters and the like.

Multi-body level 1 with its hinged level bodies 10, 20 and 30 is capable of being disposed around corners for drawing a perfectly level line from one wall to an adjacent wall.

Each level body 10, 20 and 30 preferably may comprise a threaded mount or rail system for mounting an optional "add on" laser level to one or more of the level bodies 10, 20 and 30 for hanging pictures, framework, etc.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A level multitool, comprising:
   a plurality level bodies, wherein each of the plurality of level bodies comprises at least one level, bubble level or spirit level and wherein each of the plurality of level bodies is removably connected to another of the plurality of level bodies by a hinge such that a first level body connected by a first hinge can articulate with respect to a second level body connected thereto via the first hinge so that the first and second level bodies may be releasably locked by the first hinge in a plurality of positions wherein an angle between the first and second level bodies at each position is different than the angle therebetween at each of the other plurality of positions.

2. The level multitool of claim 1 wherein each hinge comprises two slotted hinge inserts defining slots and openings fastened together by hinge bars, also defining openings, disposed in the slots and bolts inserted in the respective openings in the hinge inserts and hinge bars.

3. The level multitool of claim 2 wherein each hinge insert comprises a quick disconnect tab, preferably spring-loaded, that is received in an opening in the level body in which it is installed.

4. The level multitool of claim 1 wherein one or more sides of one or more of the plurality of level bodies defines a rule or ruler or has a rule or ruler disposed thereon.

5. The level multitool of claim 1 wherein each of the plurality of level bodies may be aligned co-linearly to increase a straight line length of level multitool.

6. The level multitool of claim 1 wherein each hinge comprises a lock-in positioner mechanism to releasably lock the level bodies connected via each respective hinge in one or more discreet angles between two respective level bodies connected via each hinge.

7. The level multitool of claim 1 wherein each hinge and/or lock-in positioner mechanism comprises means for releasably locking the level bodies connected via each respective hinge in one or more discreet angles between two respective level bodies connected via each hinge.

8. The level multitool of claim 1 wherein each of the level bodies and hinges comprises a light-weight material such as aluminum, lexan, other plastic or wood.

9. The level multitool of claim 1 wherein one or more sides of one or more of the plurality of level bodies has a magnet affixed thereon or built therein.

10. The level multitool of claim 1 wherein one or more sides of one or more of the plurality of level bodies has an angled vial, level, bubble level or spirit level affixed thereon or built therein.

11. The level multitool of claim 1 wherein one or more sides of one or more of the plurality of level bodies has a threaded mount or rail system for mounting an optional tool such as a laser level to one or more of the level bodies.

* * * * *